United States Patent [19]

Muramatsu

[11] Patent Number: 4,612,469
[45] Date of Patent: Sep. 16, 1986

[54] SPEED GOVERNOR

[75] Inventor: Kenji Muramatsu, Nagano, Japan

[73] Assignee: Kabushiki Kaisha Sankyo Seiki Seisakusho, Nagano, Japan

[21] Appl. No.: 669,925

[22] Filed: Nov. 9, 1984

[30] Foreign Application Priority Data

Nov. 10, 1983 [JP] Japan .......................... 58-174259[U]
Jul. 10, 1984 [JP] Japan .......................... 59-105067[U]

[51] Int. Cl.⁴ .......................................... H02K 49/02
[52] U.S. Cl. ....................................... 310/93; 310/105
[58] Field of Search .................. 310/93, 92, 103, 104, 310/105

[56] References Cited

U.S. PATENT DOCUMENTS 3,700,941 10/1972 Duncan ................................. 310/105
3,831,942 8/1974 Del Mar ........................... 310/105 X
4,152,617 5/1979 Janson ................................. 310/103
4,224,545 9/1980 Powell ............................. 310/105 X Primary Examiner—Donovan F. Duggan
Attorney, Agent, or Firm—Sughrue, Mion, Zinn, Macpeak & Seas

[57] ABSTRACT

A speed governor for use in a time-delay switch having an adjustable delay time, low amount of operating noise, high braking force, and simple construction. Two generally annularly shaped magnets are disposed on opposite sides of a conductive disk rotated at a higher rate than an input member by an accelerating gear train. One of the magnets is stationarily mounted while the other is rotatably adjustable in position via an adjustment plate having an adjustment lever extending outside of the casing of the device.

16 Claims, 7 Drawing Figures

SPEED GOVERNOR

BACKGROUND OF THE INVENTION

The present invention relates to an improved speed governor of the eddy-current-brake-type for use in a delayed operation switch or the like.

A delayed operation switch is, for example, provided with a speed governor (hereinafter referred to simply as a "governor") in order to set a delay time. Among the variety of conventional governors, one with an escape wheel has been in general use. This governor, however, produces much operating noise and it is not possible to adjust the operating time thereof. Other eddy-current-brake-type governors have been proposed which do not produce large amounts of operating noise and which have a variable braking force adjustment or braking force per se. On the other hand, these governors have a drawback in that they are complex and the available braking force is relatively low.

SUMMARY OF THE INVENTION

Therefore, an object of the present invention is to provide a governor providing simultaneously a high braking force and easily adjustable operating braking force.

According to the present invention, a pair of annular magnets are disposed on opposite sides of a conductive plate. One of the two magnets is fixed to a casing, while the other is circumferentially rotatably supported with its rotational phase being made easily adjustable from the outside of the casing. The annular magnet has circumferentially alternating N and S poles. Only one pair of N and S poles may be used. Since the total magnetic flux in the conductive disk varies with the relative magnetic phase of the two magnets, the braking force varies correspondingly so that the operating delay time can easily be set within a predetermined range.

In more detail, two parallel shafts are supported between a casing and top and bottom covers. An acceleration wheel train is constituted by a plurality of gears and the two shafts. A conductive disk is integrally fixed to a final one of the gears, and magnets are disposed on opposite sides of the conductive disk, one being fixed at the casing side and the other being held by an adjustment plate which is movable in the rotational direction. Thus, the gear train, the conductive disk, the adjustment plate, etc., are supported about the two shafts so as to provide a simple construction having the two shafts at the center thereof. Accordingly, the assembly operation is simplified.

DESCRIPTION OF THE PREFERRED EMBODIMENTS

Figure 1:
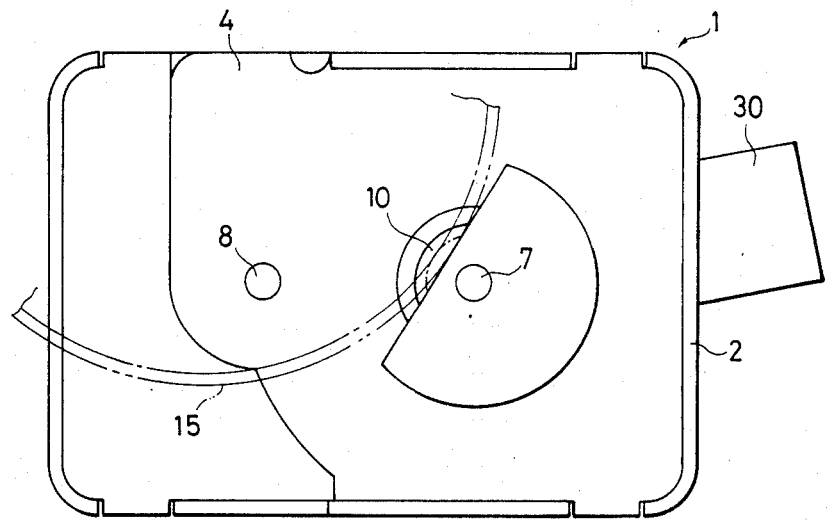
FIG. 1 is a plan view showing a governor according to the present invention.
Figure 2:
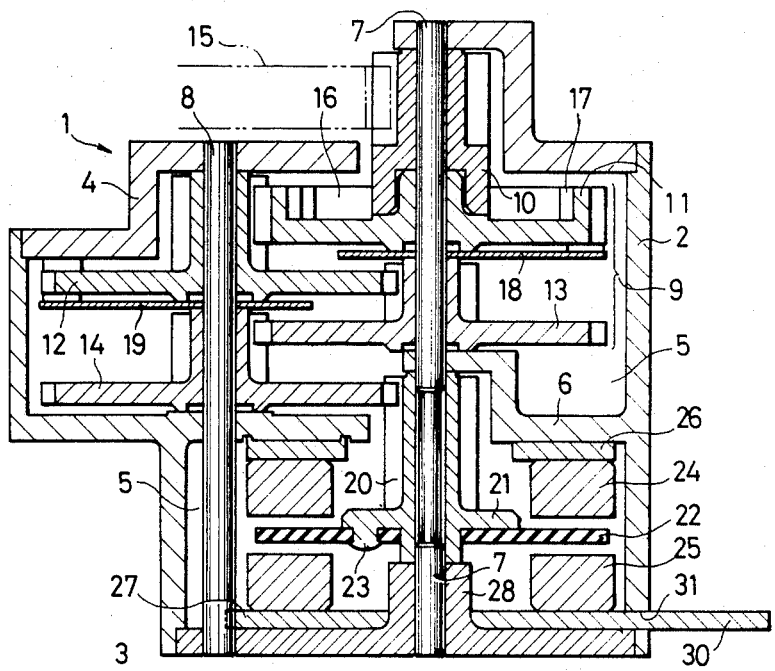
FIG. 2 is a longitudinal sectional view showing the governor of FIG. 1.
Figure 3:
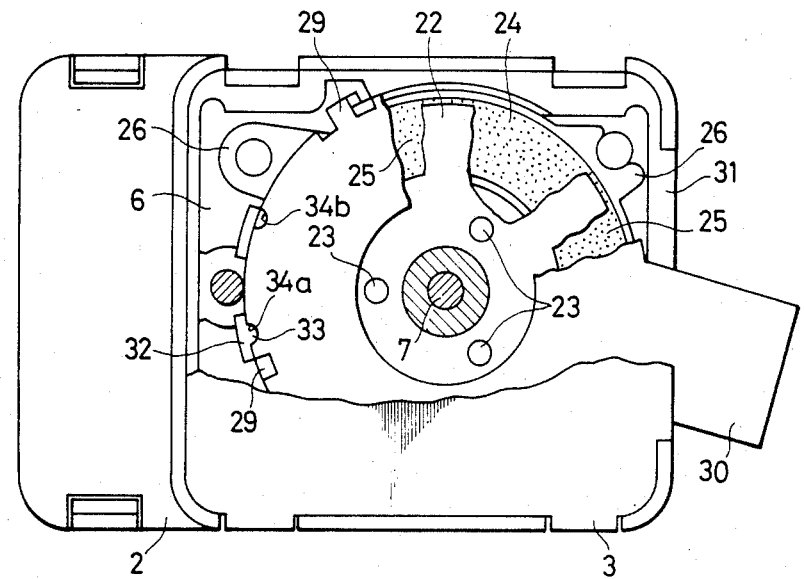
FIG. 3 is a partially cut-away bottom view.

Referring to the drawings, a preferred embodiment of the present invention will be described hereunder.

A governor 1 is incorporated in a casing 2 which is, for example, a molded plastic casing. The casing 2 is formed therein with a chamber 5 defined by a bottom and a top cover 3 and 4, which are respectively attached to the bottom and top of the casing 2. The casing 2 is integrally formed with a central partition 6 substantially at its center portion on the inside thereof so that the chamber 5 is divided into two portions, that is, upper and lower portions.

Figure 4:
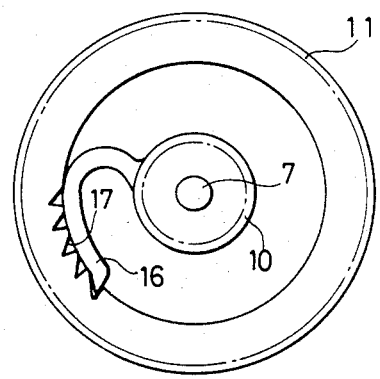
FIG. 4 is a plan view showing a ratchet portion.

The bottom cover 3, the top cover 4 and the central partition 6 support parallel shafts 7 and 8 within the chamber 5. The shaft 7 in this embodiment is located substantially at the center, and the shafts 7 and 8 alternately support an input side ratchet gear 10, a first gear 11, a composite-type second gear 12, a composite-type third gear 13, and a composite-type fourth gear 14, meshed between large and small gears and constituting an accelerator wheel train 9. The ratchet gear 10, which is mounted in opposition to the opening portion of the top cover 4, meshes with an external gear 15 and transmits the rotation of the gear 15 only in one direction to the first gear 11 by means of a ratchet 16. The ratchet 16 is integrally formed at the base portion of the ratchet gear 10 of an elastically deformable material, and it meshes with ratchet teeth 17 formed on the inner circumferential side of the first gear 11 as shown in FIG. 4. Intermediate plates 18 and 19 are inserted between the first and third gears 11 and 13 and between the second and fourth gears 12 and 14, respectively, so as to prevent interference therebetween. THe intermediate plates 18 and 19 are fixed to the side surface of the casing 2 or the like.

The shaft 7 rotatably supports a final gear 20 which meshes with large teeth of the fourth gear 14 at its intermediate portion. The final gear 20 is fitted and fixed at its boss 21 into a central hole of a conductive disk 22 and held in the state where it is prevented from rotating by an integral protrusion 23. The head of the protrusion 23 is flattened by heating. The portion where the shaft 7 supports the gear 20 is reduced in diameter, except at its upper and lower portions, so as to reduce the amount of frictional resistance.

The conductive disk 22 is rotatably disposed between a pair of magnets 24 and 25 disposed opposite one another. The pair of magnets 24 and 25, which are each annularly shaped, are fixed within the chamber 5 in the casing 2 with the conductive disk 22 located therebetween. In each of the magnets 24 and 25, N and S poles are equidistantly formed at intervals of 60 degrees. The spacing and the number of the poles may be chosen as desired. One magnet 24 is fixed to the lower surface of the central partition portion 6 by a yoke 26, and the other magnet 25 is fixed to an upper surface of an adjustment plate 27. The adjustment plate 27 is pivotally supported on a bearing 28 in the bottom cover 3, and it grasps the magnet 25 by four claws 29 formed on the outer periphery thereof. An adjustment lever 30, integrally formed at an outer peripheral portion of the adjustment plate 27, projects outside through a slit 31 formed on the side surface of the casing 2.

A positioning plate 32 is integrally formed in the rising portion of the casing 2. The positioning plate 32, formed of an elastic material, has a positioning projection 33 fitted into one of two positioning recesses 34a and 34b formed in the peripheral portions of the adjustment plate 27 so as to prevent the adjustment plate 27 from moving after positioning adjustment. The rotational angle of the adjustment plate 27 is set to about 25 degrees, corresponding to the central angle of the magnetic pole of the magnets 24 and 25, and therefore the opening angle with respect to the center defined by the two positioning recesses 34a and 34b is set also to about 25 degrees. It is a matter of course that this angle is suitably set according with the application at hand, and the position can be widely chosen by increasing the number of the positioning recesses.

Next, the operation of the governor 1 will be described.

When the gear 15 is rotated counterclockwise in FIG. 1, the ratchet gear 10 cannot mesh with the ratchet teeth 17 of the first gear 11 so that the ratchet gear 10 allows the gear 15 to rotate idly. When the gear 15 rotates in the reverse direction, on the contrary, the ratchet 16 meshes with the ratchet teeth 17 so that the rotational speed of the outside gear 15 is increased by the accelerator wheel train 9, giving a high speed rotary motion to the conductive disk 22 through the final gear 20. At this time, the rotation of the conductive disk 22 is subjected to an eddy-current braking action by the magnetic flux of the pair of magnets 24 and 25. Thus, the outside gear 15 rotates only after a predetermined delay time. In this manner, a desired delay time can be ensured.

Figure 5:
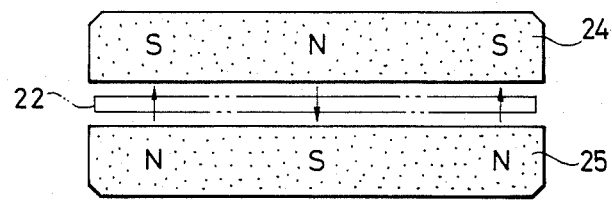
FIGS. 5 and 6 are side views showing states of magnetic flux of the magnets.
Figure 6:
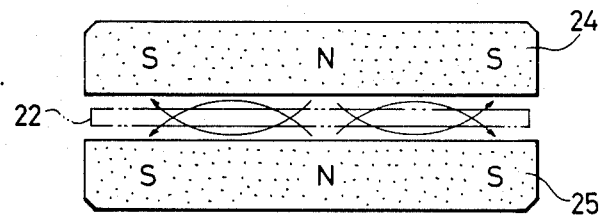

The speed governing operation, that is the braking force adjustment or braking force per se, can be adjusted by rotating the magnet 25 by the adjustment plate 27. In the case where the N and S poles of the magnets 24 and 25 are directly opposite each other as shown in FIG. 5, substantially all the magnetic flux of the magnets 24 and 25 passes through the conductive disk 22 so that large eddy currents are generated in the conductive disk 22 to thereby generate a maximum braking force. On the other hand, when like poles are opposite each other as shown in FIG. 6, the magnitude of the magnetic flux is decreased so as to make the braking force a minimum. Movement of the adjustment plate 27 to effect such movement of the magnets 24 and 25 can be easily performed externally by the adjustment lever 30. In this embodiment, the angular interval between magnetic poles is 60 degrees, and the adjustment can be changed in steps of 25 degrees so that the delay time can be changed at a ratio of about 1:0.6. Of course, the positioning projection 33 is fitted into the positioning recess 34a or 34b after the adjustment so that the adjustment plate 27 does not rotate and is held stably even if it is subjected to a rotary force acting between the magnets 24 and 25.

The process or sequence of assembling the governor 1 will now be described.

First, the shafts 7 and 8 are pressed into and fixed to the casing 2. Subsequently, the magnet 24, together with the yoke 26, is fixed to the side of the central partition portion 6 in the casing 2 by means of welding or riveting. The magnet 24 and the yoke 26 are fixed to each other by means of an adhesive or the like.

Next, the conductive disk 22 integrated with the final gear 20 is placed on the shaft 7 with the bottom cover 3 on the top. The magnet 25, together with the adjustment plate 27, is placed in the casing 2, and then the bottom cover 3 is fitted to the shafts 7 and 8. The bottom cover 3 is fixed to the casing 2 by means of fitting and engagement with a stopper claw, etc. At this point, the assembly of the magnets 24 and 25, the adjustment plate 27, etc., is complete. Thereafter, the third and fourth gears 13 and 14 are placed on the shafts 7 and 8, respectively, with the top cover 4 on the top. Then, in sequence, there are assembled the plate 18 and the second gear 12, the intermediate plate 19, the first gear 11 and the ratchet gear 10, and finally the top cover 4 is fixed to the opening face of the casing 2 in the same way as the bottom cover 3. Thus, it can be appreciated that the governor 1 can be easily assembled.

Figure 7:
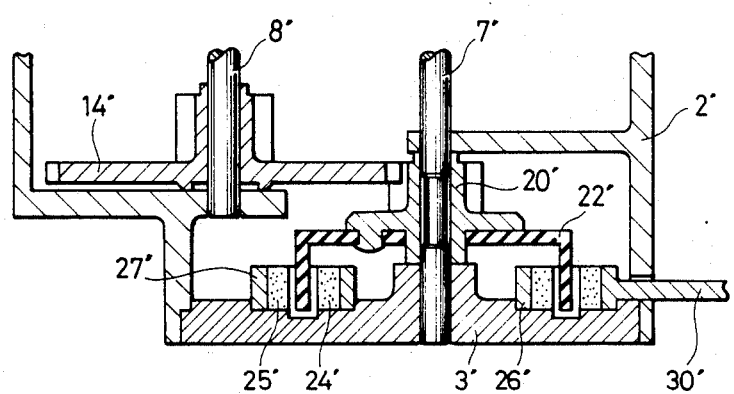
FIG. 7 is a longitudinal sectional view of a main portion of a modification of the governor of the invention.

Although the magnets 24 and 25 are arranged axially opposite to each other in the above-described embodiment, it is possible to arrange them concentrically with their diameters made different from each other as shown in FIG. 7. In other words, an accelerator wheel train is supported by shafts 7' and 8' fixed to a casing 2' in the same way as in the first-described embodiment. The fourth gear 14' meshes with a final gear 20', and a cup-like conductive plate 22' is fixed thereto. An annular magnet 24', integrally formed with a cylindrical yoke 26', is fixed to a bottom cover 3', and an annular magnet 25' is fixed to a cylindrical adjustment plate 27' made of a magnetic material, with the magnets 24' and 25' being concentrically arranged. The adjustment plate 27' is lightly pressed to fit it onto the stepped portion of the bottom cover 3'. It is possible to finely adjust the delay time by rotating the magnet 25' by an adjustment lever 30' integrally formed with the adjustment plate 27' so as to vary the relative phase of the poles of the magnets 25' with respect to the magnet 24'.

According to the present invention, a pair of annular magnets are arranged directly opposite each other, and a conductive disk is rotatably supported in the gap portion between the magnets. With this arrangement, it is possible to incorporate all components in a small space and to obtain a large braking force. Further, since the relative rotational position of these magnets can be easily adjusted from the outside, the setting of the delay time can be readily performed.

Further, since the principle of operation is based on an eddy-current braking system, the amount of operational noise is less because of the contactless arrangement. Of course, there is essentially no wear due to abrasion. Since the braking force changes in proportion to the speed of the conductive disk, stable braking is obtained, even in the initial and final period of rotation.

In the described modification, moreover, since the gears of an accelerator wheel train, a conductive disk, magnets, etc., are assembled one after another with two shafts at the center, the assembly of them can be performed systematically and efficiently, and therefore automatic assembly can be employed. Further, since these shafts are used as the center of the magnets and the adjustment plate as well as the center of rotation of the gears, the arrangement of the rotational components is not complex, and the number of parts can be reduced and the arrangement simplified.

I claim:

1. A speed governor comprising: an input member rotated by an external force; an accelerator wheel train having an input wheel driven by said input member and a final wheel rotated at a higher rotational speed than said input member and a plurality of gears coupling said input member to said final wheel, said plurality of gears being supported on a plurality of parallel shafts; a conductive plate integrated with said final wheel of said wheel train; first and second annular magnets, said magnets being disposed coaxially with one another and with said conductive plate, and said magnets having an air gap between one another, with a portion of said conductive plate being disposed in said air gap; and a casing for supporting the above-mentioned components, said first magnet being fixed to said casing and said second magnet being rotatably supported by said casing, said governor further including an adjusting means for adjusting a rotational position of said second annular magnet relative to said first annular magnet, said adjusting means including an adjustment lever projecting outside of said casing.

2. The speed governor of claim 1, wherein said adjusting means further comprises an adjustment plate fixed to said second magnet, and said adjustment lever is integral with said adjustment plate.

3. The speed governor of claim 2, wherein said adjustment plate comprises detent means for being set at a plurality of different positions.

4. The speed governor of claim 1, wherein said magnets are arranged generally parallel to one another.

5. The speed governor of claim 1, wherein said magnets are arranged concentrically with respect to one another, and wherein said conductive plate has a generally cylindrical portion extending into said air gap between said magnets.

6. The speed governor of claim 1, wherein said plurality of parallel shafts includes a final shaft for rotatably supporting said final wheel, said final shaft having an intermediate smaller diameter portion and upper and lower larger diameter portions, and wherein said final wheel is supported at said upper and lower larger diameter portions.

7. The speed governor of claim 6, wherein said magnets are arranged concentrically with respect to one another, and wherein said conductive plate has a generally cylindrical portion extending between said magnets.

8. The speed governor of claim 1, wherein said adjustment lever projects from a substantially circumferential space in said casing, and said lever is circumferentially movable to adjust said rotational position of said second annular magnet relative to said first annular magnet.

9. The speed governor of claim 1, wherein said plurality of parallel shafts comprises two parallel shafts each supporting a plurality of said gears of said accelerator wheel train.

10. A speed governor comprising: a casing and a top and a bottom cover forming a chamber therein; a portion inside said chamber; two parallel shafts supported in said chamber; a plurality of gears alternately supported by said two shafts to mesh with each other to thereby constitute an accelerator wheel train; a conductive disk integrally fixed to a final one of said gears; an adjustment plate rotatably supported by said casing; and first and second annular magnets disposed coaxially with one another and with said conductive disk, said magnets having an air gap between one another, with a portion of said conductive disk being disposed in said air gap, said first magnet being fixed to said partition and said second magnet being supported on said adjustment plate, said adjustment plate having an adjustment lever attached thereto, said adjustment lever projecting outside of said casing, whereby a rotational position of said second annular magnet can be adjusted relative to said first annular magnet from outside of said casing.

11. The speed governor of claim 10, wherein said adjustment lever is integral with said adjustment plate.

12. The speed governor of claim 11, wherein said adjustment plate comprises detent means for being set at a plurality of different positions.

13. The speed governor of claim 10, wherein said magnets are arranged generally parallel to one another.

14. The speed governor of claim 10, further comprising a shaft for rotatably supporting said final wheel, said shaft having an intermediate smaller diameter portion and upper and lower larger diameter portions, said final wheel being supported at said upper and lower larger diameter portions.

15. The speed governor of claim 10, wherein said two parallel shafts each support more than one gear of said plurality of gears.

16. The speed governor of claim 10, wherein said adjustment lever projects from a substantially circumferential space in said casing, and said lever is circumferentially movable to adjust said rotational position of said second annular magnet relative to said first annular magnet.

* * * * *